US012632675B2

(12) United States Patent
Frick et al.

(10) Patent No.: US 12,632,675 B2
(45) Date of Patent: May 19, 2026

(54) IN-CONTEXT OCR EXEMPLARS FOR OUT-OF-DOMAIN DOCUMENT INFORMATION EXTRACTION

(71) Applicant: INTUIT INC., Mountain View, CA (US)

(72) Inventors: Peter Lee Frick, Mountain View, CA (US); Hui Chen, Mountain View, CA (US); Victor Jayaseelan Savarimuthu, Mountain View, CA (US); Tharathorn Rimchala, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 153 days.

(21) Appl. No.: 18/778,884

(22) Filed: Jul. 19, 2024

(65) Prior Publication Data

US 2026/0023936 A1    Jan. 22, 2026

(51) Int. Cl.
*G06F 17/00* (2019.01)
*G06F 40/40* (2020.01)
(52) U.S. Cl.
CPC .................................... *G06F 40/40* (2020.01)
(58) Field of Classification Search
None
See application file for complete search history.

(56) References Cited

U.S. PATENT DOCUMENTS

| | | | | |
|---|---|---|---|---|
| 12,462,090 B2 * | 11/2025 | Nath | .................... | G06V 30/413 |
| 12,525,343 B2 * | 1/2026 | Bell | ........................ | G16H 40/20 |
| 2024/0265327 A1 * | 8/2024 | Pasha | ............... | G06Q 20/38215 |
| 2024/0427985 A1 * | 12/2024 | Vavrovsky | ............. | G06Q 50/18 |
| 2025/0292000 A1 * | 9/2025 | Reis Alves | .......... | G06V 30/418 |
| 2025/0335928 A1 * | 10/2025 | Gunjal | .................... | H04L 51/02 |
| 2026/0004110 A1 * | 1/2026 | Higgins | ............... | G06N 3/0475 |

OTHER PUBLICATIONS

Davidson et al., "Explainable Clustering via Exemplars: Complexity and Efficient Approximation Algorithms", arXiv:2209.0967v1 [cs.AI] Sep. 20, 2022, 22 pages.
Polewczyk et al., "ClusterTabNet: Supervised clustering method for table detection and table structure recognition", arXiv:2402.07502v1 [cs.LG] Feb. 12, 2024, 15 pages.
Xu et al., "Unsupervised Information Refinement Training of Large Language Models for Retrieval-Augmented Generation", arXiv:2402.18150v1 [cs.CL] Feb. 28, 2024, 13 pages.

* cited by examiner

*Primary Examiner* — Satwant K Singh
(74) *Attorney, Agent, or Firm* — DLA PIPER LLP US

(57) ABSTRACT

A method of extracting information from documents. The method simplifies the extraction of information from documents by first converting them into machine-readable text via OCR. It then employs a text embedding model to represent the text as high-dimensional vectors. These vectors are clustered to pinpoint natural groupings and representative document clusters. An example document from each cluster is chosen, guided by the number of non-empty fields and its relation to other documents. This selection informs the creation of an in-context-learning prompt, which includes accurately annotated labels and a system prompt defining the task for the LLM. The LLM is then prompted to extract information from a new document's OCR text, leveraging the constructed prompt for guidance.

20 Claims, 6 Drawing Sheets

200

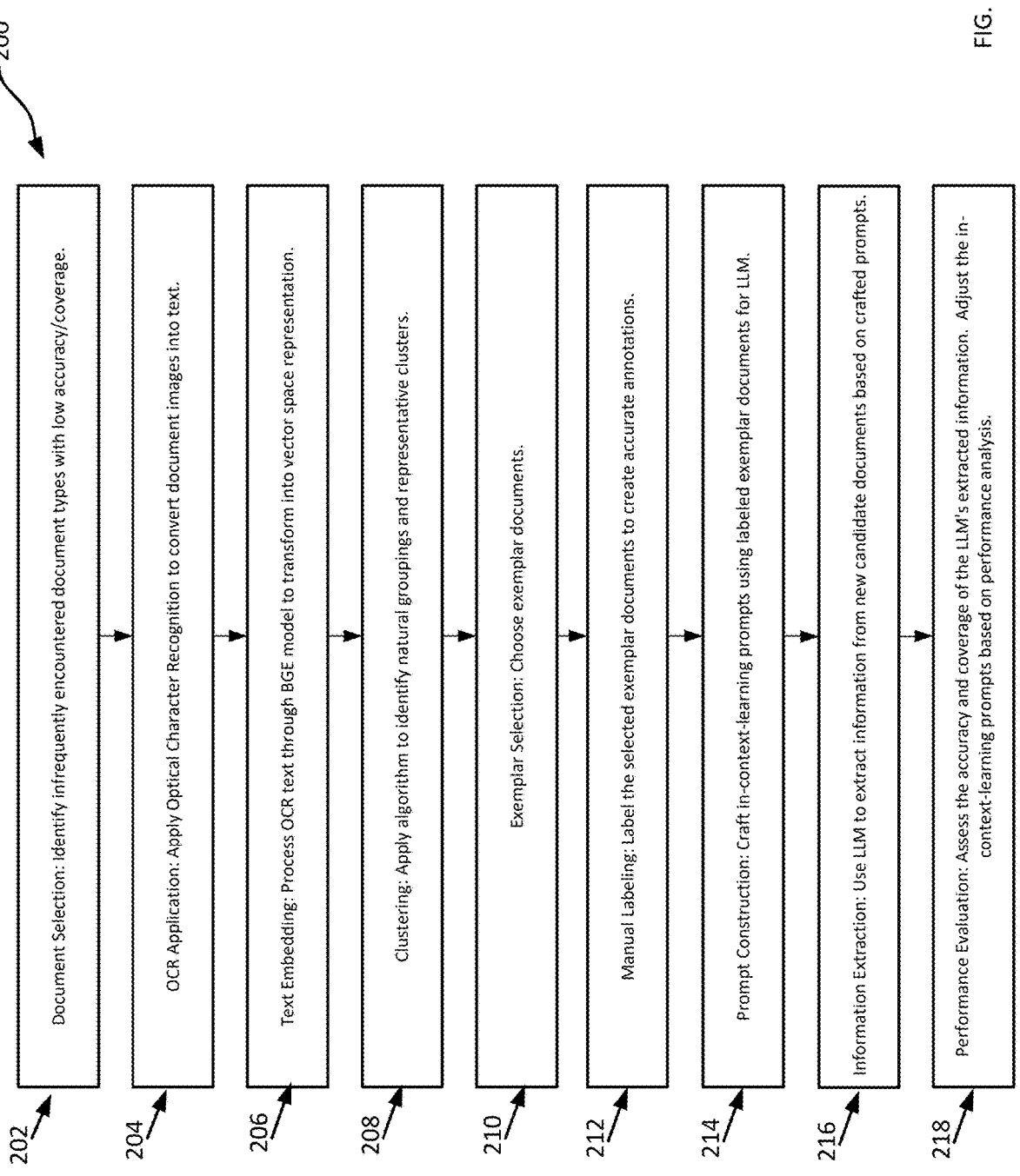

202 Document Selection: Identify infrequently encountered document types with low accuracy/coverage.

204 OCR Application: Apply Optical Character Recognition to convert document images into text.

206 Text Embedding: Process OCR text through BGE model to transform into vector space representation.

208 Clustering: Apply algorithm to identify natural groupings and representative clusters.

210 Exemplar Selection: Choose exemplar documents.

212 Manual Labeling: Label the selected exemplar documents to create accurate annotations.

214 Prompt Construction: Craft in-context-learning prompts using labeled exemplar documents for LLM.

216 Information Extraction: Use LLM to extract information from new candidate documents based on crafted prompts.

218 Performance Evaluation: Assess the accuracy and coverage of the LLM's extracted information. Adjust the in-context-learning prompts based on performance analysis.

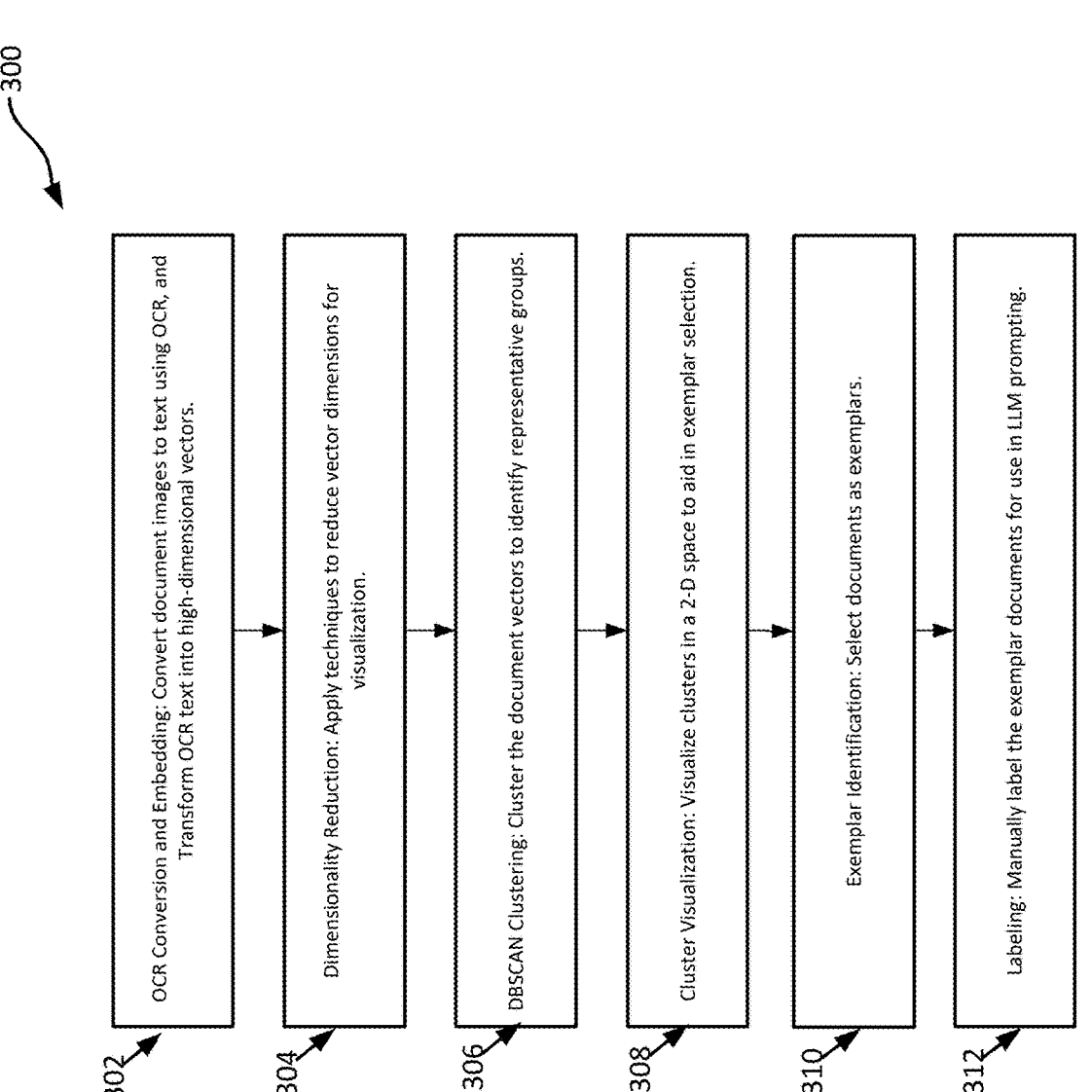

302 OCR Conversion and Embedding: Convert document images to text using OCR, and Transform OCR text into high-dimensional vectors.

304 Dimensionality Reduction: Apply techniques to reduce vector dimensions for visualization.

306 DBSCAN Clustering: Cluster the document vectors to identify representative groups.

308 Cluster Visualization: Visualize clusters in a 2-D space to aid in exemplar selection.

310 Exemplar Identification: Select documents as exemplars.

312 Labeling: Manually label the exemplar documents for use in LLM prompting.

402  Exemplar Preparation: Ensure each cluster exemplar is hand-labeled accurately.

404  System Prompt Creation: Define the information extraction task for the LLM.

406  In-context Example Formation: Combine OCR text and labels from exemplar documents.

408  Prompt Concatenation: Merge system prompt with in-context examples into a single string.

410  Task Prompt Addition: Append the task directive for the candidate document's OCR.

412  Final Prompt Assembly: Create the final prompt by concatenating all prompt components.

FIG. 4

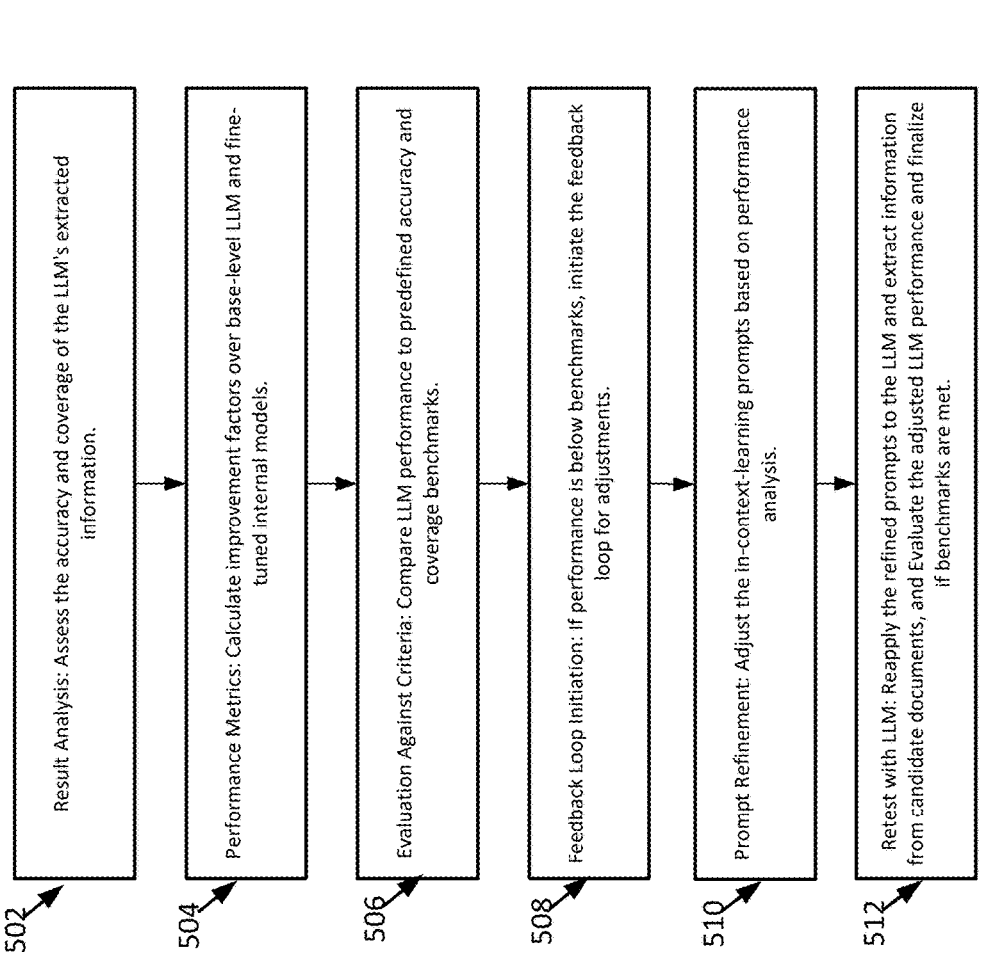

502  Result Analysis: Assess the accuracy and coverage of the LLM's extracted information.

504  Performance Metrics: Calculate improvement factors over base-level LLM and fine-tuned internal models.

506  Evaluation Against Criteria: Compare LLM performance to predefined accuracy and coverage benchmarks.

508  Feedback Loop Initiation: If performance is below benchmarks, initiate the feedback loop for adjustments.

510  Prompt Refinement: Adjust the in-context-learning prompts based on performance analysis.

512  Retest with LLM: Reapply the refined prompts to the LLM and extract information from candidate documents, and Evaluate the adjusted LLM performance and finalize if benchmarks are met.

FIG. 5

IN-CONTEXT OCR EXEMPLARS FOR OUT-OF-DOMAIN DOCUMENT INFORMATION EXTRACTION

BACKGROUND

The field of information extraction from documents has seen substantial advancements with the advent of machine learning techniques, particularly Large Language Models (LLMs). These models are capable of processing and understanding vast amounts of text data, making them ideal for tasks downstream of Optical Character Recognition (OCR), which converts document images into machine-readable text. The extracted text data can then be processed through a text embedding model to transform it into a high-dimensional vector space representation. Clustering algorithms, such as Density-Based Spatial Clustering of Applications with Noise (DBSCAN), can be applied to these vectors to identify natural groupings within the data and representative clusters within the distribution of the documents. This approach has been successful in viewing the intrinsic structure of the data distribution. These insights, combined with large scale data labeling, can be combined to train the model and thus support frequently encountered documents.

However, the current state of the art has notable deficiencies when it comes to infrequently encountered documents, particularly those with few labeled examples available. The performance of existing systems, measured by accuracy and coverage, often falls short when dealing with these types of documents. This is primarily due to the extensive labeling effort typically associated with training AI/ML systems. The process of labeling is a dedicated effort from trained human annotators, making it a time-consuming and costly endeavor. Furthermore, existing retrieval-augmented generation (RAG) models often focus on retrieving the closest examples for learning, which does not adequately represent the full document distribution. This limitation becomes particularly pronounced when dealing with diverse and infrequently encountered documents. Therefore, there is a demand for improved systems and methods that can effectively extract information from infrequently encountered documents with limited labeled examples.

SUMMARY

Embodiments disclosed herein solve the aforementioned technical problems and may provide other technical solutions as well. Contrary to conventional techniques, the disclosed solution includes a novel method and system for extracting information from documents.

An example embodiment includes a method of extracting information from documents, comprising receiving machine-readable text data extracted from documents via OCR, processing the text data through a text embedding model to transform the text data into a high-dimensional vector space representation, applying a clustering algorithm to the vectors to identify natural groupings within the data and representative clusters within a distribution of the documents, selecting an example document from each identified cluster based on at least one of a number of non-empty fields in the example document and a relationship between the example document and other documents in the cluster, constructing an in-context-learning prompt for an LLM using labels in the documents including accurate annotations for the data fields present in the text, the prompt including a system prompt that defines information extraction for the LLM and in-context examples comprising the OCR text from the example documents and their corresponding labels, and prompting the LLM to extract information from a new candidate document's OCR text based on the constructed prompt.

A system for extracting information from documents, the system comprising a processor configured to receive machine-readable text data extracted from documents via OCR, process the text data through a text embedding model to transform the text data into a high-dimensional vector space representation, apply a clustering algorithm to the vectors to identify natural groupings within the data and representative clusters within a distribution of the documents, select an example document from each identified cluster based on at least one of a number of non-empty fields in the example document and a relationship between the example document and other documents in the cluster, construct an in-context-learning prompt for an LLM using labels in the documents including accurate annotations for the data fields present in the text, the prompt including a system prompt that defines information extraction for the LLM and in-context examples comprising the OCR text from the example documents and their corresponding labels, and prompt the LLM to extract information from a new candidate document's OCR text based on the constructed prompt.

BRIEF DESCRIPTION OF THE DRAWINGS

So that the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may apply to other equally effective example embodiments.

FIG. 2 depicts an operational flowchart for document processing and information extraction, according to aspects of the present disclosure.

FIG. 3 shows a method for clustering and selecting example documents, in accordance with example embodiments.

FIG. 4 presents a flowchart for generating optimized prompts, according to an aspect of the present disclosure.

FIG. 5 outlines a performance evaluation and adjustment flowchart, according to embodiments of the present disclosure.

DETAILED DESCRIPTION OF SEVERAL EMBODIMENTS

Figure 1:
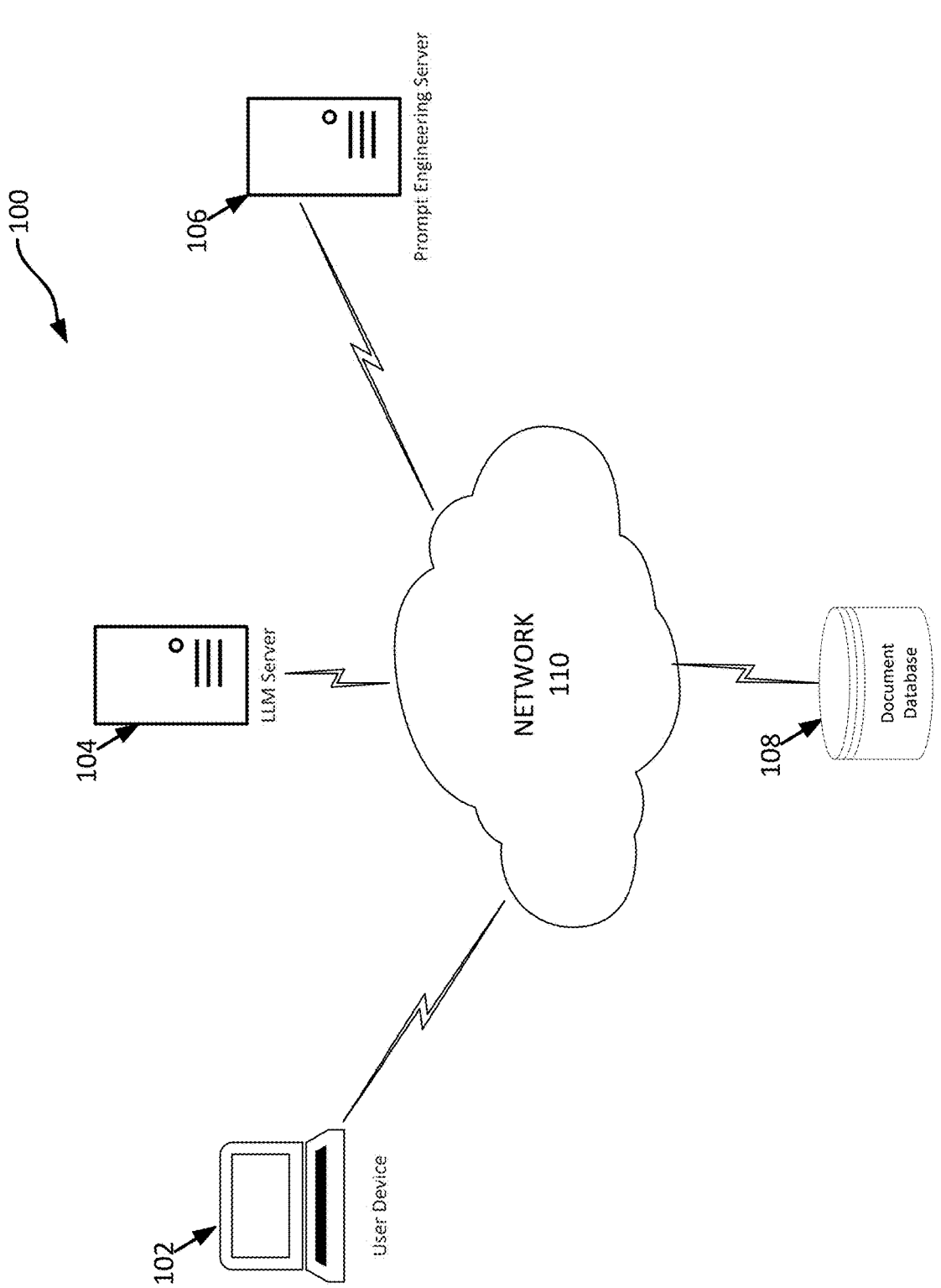
FIG. 1 illustrates a system diagram for managing prompts and data exchange, according to an embodiment.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatuses as known by one of ordinary skill in the relevant art may not be discussed in detail but are intended to be part of the specification where appropriate. In the examples illustrated and discussed herein, any specific values should be interpreted to be illustrative and non-limiting. Thus, other example embodiments may have different values. It is noted that similar reference numerals and letters refer to similar items in the figures, and once an item is defined for one figure, it is possible that it need not be further discussed for the other figures.

The task of preparing legal documents (e.g. tax returns) often necessitates the precise manual entry of data from a variety of forms. A suite of AI/ML systems may be employed that are capable of high-fidelity information extraction. These systems' efficacy is gauged by two primary metrics: accuracy, which is the proportion of correct data extracted when a field is targeted, and coverage, which is the rate of successful data extraction when the field label is present. However, to reach satisfactory levels of performance, these AI/ML systems typically require extensive training on thousands of labeled examples. The generation of these labels is a labor-intensive process, demanding the attention of skilled human annotators. Consequently, documents that are encountered less frequently often lack labeled data, presenting a historical challenge in delivering high-quality AI solutions swiftly for these rarer documents.

In response to this challenge, the current disclosed solution synergizes proprietary data with advanced third-party LLMs, to deliver performance that surpasses that of internally fine-tuned models in a transfer learning context. It was found that by labeling a small subset (e.g., 4) of examples—as opposed to the customary thousands—this method has achieved a significant (e.g., 2.4-fold) increase in the product of accuracy and coverage over the baseline performance of the LLM. Furthermore, it has enhanced the accuracy and coverage of fine-tuned internal models used in the transfer setting by a significant (e.g., 2.2) amount. This improvement represents a leap forward in the field of information extraction from infrequently encountered documents.

The present disclosure relates to a method of extracting information from infrequently encountered documents. This method leverages a combination of proprietary data and third-party LLM to enhance the performance of information extraction. The method is particularly beneficial for documents that typically have low accuracy and coverage due to a lack of sufficient labeled examples for training machine learning models.

The method may involve various phases. The first phase may include embedding and clustering document OCR to identify representative clusters within the document distribution. This process involves transforming the OCR text into a high-dimensional vector space representation using a text embedding model, followed by the application of a clustering algorithm (e.g., DBSCAN) to these vectors. The text embedding model used in this process may be any suitable model capable of converting text into dense vector representations. Examples of such models may include Word2Vec, GloVe, FastText, BERT, or custom-trained domain-specific embedding models. This approach allows for the identification of natural groupings within the data, effectively capturing the distribution of the document types. The second phase of the method may involve the use of exemplar documents from each identified cluster to create in-context-learning prompts for a third-party LLM. These exemplar documents are selected based on their representation of their respective clusters, ensuring that they provide a comprehensive overview of the document distribution. The prompts crafted for the LLM guide the model in extracting relevant information from new candidate documents, thereby improving the accuracy and coverage of data extraction.

For example, the method may commence with the selection of an identified document type that may be plagued by unsatisfactory accuracy and coverage when processed by both internally trained models in a transfer learning setting and external LLMs. In this inventive approach, OCR is initially employed to represent hundreds of document images as the detected plain text within those documents. Subsequently, the document OCR is passed through a text embedding model, for example, the BGE model, to obtain a vector representation of the documents. These vectors are clustered using the DBSCAN algorithm. To fine-tune the clustering parameters, the document vectors undergo a dimensionality reduction to two dimensions that maximally retain the information within the two components. Visualizing this 2-D representation illustrates the document distribution as composed of a number of representative clusters. The solution effectively capitalizes on these clusters to label a single exemplar document from each cluster, as opposed to the exhaustive labeling of all examples, which is a prerequisite for conventional supervised fine-tuning of AI models. The exemplar documents are judiciously chosen as those containing the greatest number of non-empty fields within their respective clusters. In the subsequent phase of the innovation, these cluster exemplars are beneficial in crafting an in-context-learning prompt that is dispatched to a third-party LLM. Prior to this, each exemplar from the clusters (e.g., one for each cluster) is hand-labeled with accurate labels.

In a specific example, the prompt initiation may involve a system prompt that delineates the information extraction task to the LLM such as: "You are a financial assistant that finds key information in OCR. It is beneficial to extract only information present that is in the OCR and with high confidence. If the field is low confidence extract. Find extractable key-value pairs in this document and return the information in parseable JSON format." Subsequently, the prompt incorporates the cluster exemplars to furnish the LLM with in-context examples of OCR and corresponding labels. For each exemplar, it is first introduced as an example, followed by the presentation of both the OCR and labels, where the labels are a string representation of a dictionary with field names as keys and the values as the human-generated annotations. More precisely, the demonstration prompt may be articulated as: "OCR: desired extraction:" This process is replicated for the number of exemplars utilized (one for each cluster), which are then amalgamated into a single string. The final component of the prompt directs the LLM to the extraction task based on the OCR of the candidate document that requires processing. This task prompt may be formulated as: "Now look only at the following OCR and extract the relevant information: OCR: desired extraction".

The system prompt, demonstration prompt, and task prompt are then concatenated to formulate the final prompt. This final prompt is subsequently employed to invoke text generation from a third-party LLM.

In a working example, the solution was applied to the 1099-K, a document type with a scarcity of labeled examples. The existing internal solution was an LLM trained on approximately 25,000 documents from the top-10 frequently uploaded tax forms (excluding 1099-K). When applied to the 1099-K, this model yielded an accuracy of 0.78 and a coverage of 0.48. The top-performing external solution assessed was GPT-4, which achieved an accuracy of 0.64 and a coverage of 0.52. The solution delineated herein attained an accuracy of 0.91 and a coverage of 0.89 (n=72). This underscores the efficacy of this innovation in the extraction of information from infrequently encountered documents. In addition, the disclosed method may potentially be leveraged to generate substantial volumes of labeled data for the supervised fine-tuning of models. The disclosed solution provides a robust solution for processing infrequently encountered documents, offering improved performance over existing models and reducing the labeling workload typically associated with training AI/ML systems.

It is noted that the disclosed solution is a practical application rooted in document selection and prompt engineering for improvement of LLM RAG systems. The prompt engineering server, in conjunction with the LLM server, performs a series of concrete, technical steps to transform the raw OCR text data into actionable, structured information. This is achieved through an integration of clustering algorithms and in-context learning prompts that guide the LLM's processing capabilities. The prompt engineering server's role in selecting representative documents from clusters and constructing tailored prompts based on these selections is a specific application of computer technology that solves a technical problem—namely, the efficient and accurate extraction of information from infrequently encountered documents with limited labeled examples.

Furthermore, the interaction between the prompt engineering server and the LLM server embodies an inventive concept that applies machine learning in a meaningful way to achieve a particular result. The system's use of advanced clustering techniques to identify natural groupings within the data, followed by the strategic selection of exemplar documents, enables the creation of optimized prompts that substantially improve the LLM's performance. In other words, this is a specific method that leverages the synergistic potential of prompt engineering and LLMs to address a challenge in the field of information extraction. The resulting improvement in accuracy and coverage of data extraction from complex documents like the 1099-K forms, as evidenced by the performance evaluation and adjustment flowchart, underscores the practical utility and technical contribution of the claimed method and system.

FIG. 1 serves as a visual representation of the system's 100 architecture that facilitates the solution method for extracting information from documents using LLMs. The system diagram illustrates the interconnectedness of various components within the networked environment. Central to this architecture is the user device 102, which serves as the interface for users to interact with the system 100. Users can initiate processes, input data, and receive results through this device.

The network 110 acts as the communication backbone, linking the user device 102 with the LLM server 104 and the prompt engineering server 106. The LLM server 104 is a dedicated server that hosts the LLM, such as GPT-4, which is responsible for the generation of text based on the prompts received. This server processes the in-context-learning prompts and extracts information from the OCR text of documents.

The prompt engineering server 106 is tasked with the construction and refinement of prompts that are used to guide the LLM in the information extraction process. This server may handle the selection of exemplar documents, the manual labeling of data fields, and the assembly of the final prompts that include system prompts, in-context examples, and task directives.

Additionally, the document database 108 serves as a repository for storing document images, OCR text data, and other relevant information that may be used throughout the information extraction process. This database ensures that data is readily available for processing and can be retrieved or stored as the system operates.

The overall system diagram encapsulates the workflow and data exchange that occur within the system 100, highlighting the collaborative interaction between the servers and the user device via the network 110. This diagram provides a high-level overview of how the components work in concert to achieve the goal of extracting information from infrequently encountered documents with improved accuracy and coverage, thereby addressing the challenges associated with processing such documents.

Referring to FIG. 2, an overall operational flowchart illustrates the method 200 of extracting information from infrequently encountered documents. For illustration purposes only, the process 200 is described as being used for a tax application. The process 200 begins with a document selection step 202, where infrequently encountered document types with low accuracy and coverage are identified. For instance, in a tax preparation scenario, a specific tax form such as the 1099-K, which typically has a limited number of labeled examples available for training machine learning models, may be selected.

Next, an OCR application step 204 is performed to convert document images into machine-readable text. This step may involve the use of an OCR engine that scans the images of the tax documents and converts them into text data. The OCR engine may be configured to recognize a variety of fonts and text styles, and may also be capable of handling documents with varying levels of image quality.

Following the OCR application step 204, a text embedding step 206 is carried out. In this step, the OCR text is processed through a text embedding model, referred to as BGE, which transforms the textual information into a high-dimensional vector space representation. This transformation allows for the efficient processing and analysis of the text data, enabling the system to capture the semantic and syntactic relationships between different parts of the text.

In the text embedding step 206, the BGE model distills the essence of the OCR text into a form that is amenable to machine learning algorithms. By leveraging advanced natural language processing techniques, the BGE model analyzes the text to discern patterns and structures that are indicative of the underlying meaning. It encodes this information into vectors, which are multi-dimensional numerical arrays that can be processed computationally. These vectors serve as a bridge between the raw text data and the analytical capabilities of the LLM, enabling it to understand the context and nuances of the text. The high-dimensional nature of these vectors ensures that the information is preserved, including subtle linguistic cues that might be lost with more simplistic representations. This nuanced understanding is what allows the LLM to perform information extraction with a high degree of precision, even when confronted with complex or unfamiliar document types.

The process 200 proceeds to a clustering step 208, where the clustering algorithm (e.g., DBSCAN, K-Means clustering, Hierarchical clustering, etc.) is applied to the vectors generated in the text embedding step 206. The DBSCAN algorithm identifies natural groupings within the data, effectively capturing the distribution of the document types. This step may involve the use of dimensionality reduction techniques to facilitate the visualization and interpretation of the clusters.

The clustering step 208 is a method where the DBSCAN algorithm's role is to discern the inherent structure within the high-dimensional data derived from the OCR text. By identifying areas of high density, the algorithm delineates clusters without the prerequisite of pre-specified cluster counts, which is particularly advantageous for datasets with unknown cluster patterns. The clusters formed are indicative of the various document types and their intrinsic characteristics. To enhance the interpretability of these clusters, dimensionality reduction techniques such as Principal Component Analysis (PCA) or t-Distributed Stochastic Neighbor Embedding (t-SNE) may be employed. These techniques reduce the complexity of the data while preserving its core structure, allowing for a two-dimensional visualization that provides insights into the data's organization. This visualization aids in the qualitative assessment of the clustering results and also informs the selection of exemplar documents, ensuring that the chosen exemplars are accurately representative of the diverse document types within the dataset. Through this clustering process, the method 200 efficiently categorizes documents, paving the way for the subsequent phase of prompt construction and information extraction.

Following the clustering step 208, an exemplar selection step 210 is performed. In this step, an exemplar document is selected from each identified cluster. The exemplar documents may be chosen based on the criterion of having the maximum number of non-empty fields, ensuring that they are representative of their respective clusters. This selection process reduces the labeling workload, as it eliminates the need to label documents within a cluster.

The exemplar selection step 210 is a strategic and efficient approach to reduce the extensive labeling workload typically associated with training AI/ML systems. By selecting an exemplar document from each identified cluster, the method 200 ensures that the chosen documents are not just randomly picked but are representative of the broader characteristics and variations within their clusters. The exemplar documents are selected based on having the maximum number of non-empty fields, which is a proxy for the richness of information they contain. This criterion (along with other selection criterion) ensures that the exemplar documents provide a comprehensive overview of the cluster's content, making them ideal for training the LLM with a diverse set of examples. Moreover, this process streamlines the labeling effort by focusing on a subset of documents that encapsulate the salient features of their respective clusters, thereby optimizing the training process for the LLM and enhancing its ability to generalize from these exemplars to new, unseen documents.

Once the exemplar documents have been selected, they undergo a manual labeling step 212. In this step, accurate annotations are created for the data fields present in the text of the exemplar documents. These labels serve as a guide for the LLM in the subsequent information extraction process.

In the manual labeling step 212, the creation of accurate annotations is a process where trained human annotators examine the OCR text of each exemplar document to identify and demarcate specific data fields. This involves discerning and marking out various types of information such as names, addresses, monetary amounts, dates, and other pertinent details that are relevant to the document's context. The annotators use a predefined schema to ensure consistency in labeling across different documents, which may include assigning labels that correspond to the semantic meaning of the fields, such as "payer_name" or "transaction_amount." The accuracy of these annotations is beneficial, as they form the foundation for the LLM's learning and subsequent information extraction capabilities. The labeled data fields are encoded into a structured format, typically as a dictionary or JSON object, where each field name is paired with its corresponding value as extracted from the document. This structured representation not merely facilitates the training of the LLM but also serves as a reference point for evaluating the model's performance in accurately extracting information from new, unseen documents.

The next step in the process 200 is the prompt construction step 214. In this step, in-context-learning prompts are crafted for the LLM using the labeled exemplar documents. The prompts include a system prompt that defines the information extraction task for the LLM, as well as in-context examples comprising the OCR text from the exemplar documents and their corresponding labels.

In the prompt construction step 214, the crafting of in-context-learning prompts is a nuanced process that involves the integration of multiple components to effectively guide the LLM. The system prompt is designed to clearly articulate the task at hand, providing explicit instructions to the LLM on the specific types of information to be extracted from the OCR text, such as identifying and extracting named entities, dates, monetary values, and other relevant data points. This prompt sets the stage for the LLM's task by establishing the context and expectations for the extraction process. Additionally, the in-context examples are carefully selected from the labeled exemplar documents to showcase a diverse array of document formats and layouts, as well as potential edge cases, thereby equipping the LLM with a comprehensive understanding of the task's scope. These examples include both the OCR text and the crafted labels, which are presented in a structured format that mirrors the desired output, such as a JSON object. By providing these examples, the LLM is exposed to a variety of scenarios, enabling it to learn and adapt its extraction strategies to handle new and unseen documents with similar characteristics. The combination of the system prompt and the in-context examples forms a rich and informative prompt that primes the LLM for high-precision information extraction, tailored to the specific requirements of the task.

The information extraction step 216 prompts the LLM to extract information from a new candidate document's OCR text based on the constructed prompt. The LLM uses the knowledge gained from the in-context examples to identify and extract the relevant data fields from the candidate document. The extracted information is output in a structured format, such as JSON, facilitating further processing and analysis.

Upon receiving the OCR text from a new candidate document, the LLM embarks on a process of information extraction, utilizing the in-context examples as a blueprint for identifying and parsing the relevant data fields. The LLM scans the OCR text, applying learned patterns and structures from the exemplar documents to detect and isolate pertinent information such as names, financial figures, dates, and other specific details that the system prompt has defined as targets for extraction. This process is not merely a replication of the exemplar patterns but an intelligent interpretation that accounts for variations and anomalies in the new document, ensuring a high degree of accuracy. Once the relevant data fields are identified, the LLM encapsulates this information into a structured format, typically JSON, which is a lightweight data-interchange format that is easy for humans to read and write, and easy for machines to parse and generate. This structured output streamlines the integration of extracted data into various applications and databases for further processing and analysis and also provides a clear and organized representation of the extracted information, which is beneficial for subsequent tasks such as data validation, reporting, and insights generation. The ability to output structured data is a testament to the LLM's advanced capabilities and the effectiveness of the in-context-learning prompts in guiding the model to fulfill complex information extraction tasks with precision.

The performance evaluation step 218 assesses the accuracy and coverage of the LLM's extracted information. This step involves comparing the extracted information to a set of ground truth data and calculating improvement factors over base-level LLM and fine-tuned internal models. If the performance of the LLM falls below predefined benchmarks, the in-context-learning prompts are adjusted based on the performance analysis, and the information extraction process is repeated with the refined prompts. This feedback loop ensures that the system continually improves its performance, leading to more accurate and reliable data extraction.

In the performance evaluation step 218, the system undertakes a comprehensive analysis of the LLM's output by comparing the extracted information against a curated set of ground truth data, which serves as a benchmark for the expected results. This comparison is beneficial in quantifying the LLM's precision and reliability in data extraction tasks. The system calculates improvement factors by assessing the degree to which the LLM's performance surpasses that of baseline models, including both the base-level LLM and any internally fine-tuned models previously in use. Should the LLM's performance metrics, such as accuracy—reflecting the proportion of correctly extracted fields—and coverage—indicating the extent to which the relevant fields are extracted—fall short of the established benchmarks, the system initiates a refinement process. This involves a detailed analysis of the LLM's responses to identify patterns in errors or omissions, which informs the adjustment of the in-context-learning prompts. The refined prompts are designed to address identified deficiencies, providing the LLM with enhanced guidance that may include additional examples, clearer instructions, or corrections to previously misunderstood or overlooked information. The LLM is re-prompted with these optimized prompts, and the information extraction process is iterated. This iterative feedback loop is a dynamic mechanism that rectifies immediate inaccuracies and also evolves the system's capabilities over time, ensuring continuous learning and adaptation. Through this process, the system aspires to achieve a consistently high standard of data extraction, thereby enhancing the overall utility and robustness of the LLM in practical applications.

In a specific use case example in the tax domain, a tax preparation service may use this method 200 to process 1099-K tax forms. These forms are infrequently encountered and typically have a limited number of labeled examples available for training machine learning models. By applying this method, 200 the tax preparation service can improve the accuracy and coverage of data extraction from 1099-K forms, leading to more efficient and reliable tax filing for their customers. The method 200 can be applied to other types of tax forms or other types of documents as well, providing a flexible and scalable solution for information extraction from infrequently encountered documents.

Referring now to FIG. 3, a flowchart of a method 300 of clustering and selecting example documents is depicted. The method 300 begins with an OCR conversion and embedding step 302. In this step, document images are converted to text using OCR. The OCR engine used in this step may be capable of recognizing a variety of fonts and text styles and may also be capable of handling documents with varying levels of image quality. The OCR engine may be configured to recognize and extract text from both printed and handwritten documents and may also be capable of handling documents in various languages. The OCR text is transformed into high-dimensional vectors using a text embedding model, such as the BGE model. This transformation allows for the efficient processing and analysis of the text data, enabling the system to capture the semantic and syntactic relationships between different parts of the text.

The method 300 proceeds to a dimensionality reduction step 304. In this step, the high-dimensional vectors generated in the previous step are reduced to two dimensions that maximally retain the information within the two components. This reduction facilitates the visualization and interpretation of the clusters in the subsequent steps. Various dimensionality reduction techniques may be used in this step, such as Principal Component Analysis (PCA), t-Distributed Stochastic Neighbor Embedding (t-SNE), or Uniform Manifold Approximation and Projection (UMAP).

Next, the method 300 proceeds to a clustering step 306. In this step, the DBSCAN clustering algorithm is applied to the two-dimensional vectors to identify representative groups within the data. The DBSCAN algorithm identifies natural groupings within the data, effectively capturing the distribution of the document types. This step may involve the use of various parameters of the DBSCAN algorithm, such as the minimum number of points to form a dense region and the maximum distance between two samples for them to be considered as in the same neighborhood.

In the clustering step 306, the DBSCAN algorithm operates by scanning the reduced two-dimensional vector space to locate areas of high density, which are indicative of clusters. The algorithm's parameters, such as the epsilon value defining the maximum distance between two points to be considered part of the same neighborhood, and the minimum number of points that constitute a dense region, are fine-tuned to ensure the accurate identification of clusters. These parameters are beneficial as they determine the granularity of the clustering, affecting both the sensitivity to outliers and the ability to detect smaller, more nuanced clusters. By adjusting these parameters, the algorithm can be tailored to the specific characteristics of the document types being analyzed, ensuring that the clusters formed are both meaningful and representative of the underlying data distribution. The outcome of this clustering step is a set of distinct groups, each containing documents that share similar features, which can be used to select exemplar documents for the subsequent labeling and prompt construction steps, thereby streamlining the information extraction process for the LLM.

Method 300 proceeds to a cluster visualization step 308. In this step, the clusters identified in the previous step are visualized in a two-dimensional space. This visualization aids in the interpretation of the clusters and facilitates the selection of exemplar documents in the subsequent step. Various visualization techniques may be used in this step, such as scatter plots, heatmaps, or dendrograms.

The visualization of clusters in a two-dimensional space is a beneficial step that enhances the comprehensibility of the data's structure and the relationships within it. Scatter plots may be employed to plot individual documents as points in the space, with proximity indicating similarity, allowing for the immediate identification of dense regions that signify clusters. Heatmaps can be utilized to represent the density of documents within the space, with varying color intensities reflecting the concentration of documents, thus highlighting the core areas of clusters. Dendrograms, on the other hand, offer a tree-like structure that illustrates the hierarchical relationships and the formation of clusters at different levels of granularity. These visualization techniques aid in the qualitative assessment of the clustering results and also inform the selection of exemplar documents, ensuring that the chosen exemplars are truly representative of the diverse document types within the dataset. Through this visualization, the method efficiently categorizes documents, paving the way for the subsequent phase of prompt construction and information extraction.

Next, the method 300 proceeds to an exemplar identification step 310. In this step, exemplar documents are selected from each identified cluster. The exemplar documents may be chosen in part based on the criterion of having the maximum number of non-empty fields, ensuring that they are representative of their respective clusters. This selection process reduces the labeling workload, as it eliminates the need to label documents within a cluster. The system may use various criteria to select the exemplar documents, such as the number of non-empty fields, the quality of the OCR text, or the similarity of the document to other documents in the cluster.

In the exemplar identification step 310, the selection of exemplar documents is a strategic process that aims to maximize the representativeness and diversity of the documents chosen for labeling. The primary criterion for selection is the presence of a high number of non-empty fields within a document, which suggests a comprehensive dataset that can provide the LLM with a broad spectrum of information to learn from. Additionally, the quality of the OCR text is considered, ensuring that the text is legible and accurately reflects the original document's content, which is beneficial for the LLM's training (e.g., fine tuning) and subsequent performance. Moreover, the similarity of the document to others within the cluster is evaluated, which may include factors such as the document's layout, format, and content. Documents that are structurally similar to others in the cluster can serve as robust exemplars, as they likely encapsulate common features and variations found within the group. By employing these criteria, the system effectively narrows down the selection to documents that reduce the labeling workload and also enrich the LLM's learning experience, thereby enhancing its ability to generalize and accurately extract information from a wide array of infrequently encountered documents.

In the exemplar identification step 310, the system may employ a variety of quantitative and qualitative methods to select the exemplar documents from each cluster. Quantitatively, the system may use statistical measures such as the frequency of non-empty fields or a scoring system that assigns weights to different fields based on their relevance or completeness. Qualitatively, the system might consider the clarity and legibility of the OCR text, ensuring that the exemplar documents are of high quality and free of OCR errors. Additionally, the system may analyze the structural layout of the documents, selecting those that are representative of the common patterns within the cluster. Semantic analysis may also be employed to evaluate the content of the documents, choosing exemplars that encompass a broad range of topics or information pertinent to the cluster. Furthermore, the system may incorporate feedback loops, where the performance of the LLM on initial exemplars informs the selection of subsequent exemplars, optimizing the representativeness and diversity of the training data.

Beyond the primary criteria of non-empty fields and document similarity, additional metrics for selecting exemplar documents from clusters can be considered to enhance the representativeness and utility of the exemplars. One such metric may be the distance of a document to the centroid of its cluster. The centroid is a central vector that represents the average position of the vectors within a cluster. Documents that are closer to the centroid can be considered as more central or typical of the cluster's characteristics. By selecting documents that are near the centroid, the system may ensure that the exemplar documents embody the core features of the cluster, which may include common layouts, terminology, and data field arrangements.

Another metric that may be employed is the density of the surrounding area in the vector space. Documents that reside in denser regions of the cluster may be surrounded by a higher number of similar documents, indicating a strong representation of common cluster traits. Selecting exemplars from these dense regions can provide robust training examples for the LLM, as they are likely to include instances that are representative of the cluster's majority. This can be particularly beneficial when the goal is to train the LLM to recognize and extract information from documents that are frequently encountered within a particular cluster.

Additionally, the system may consider the diversity of the exemplar documents across the clusters. By ensuring that the selected exemplars cover a wide range of variations within the cluster, the system can provide the LLM with a comprehensive understanding of the cluster's scope. This diversity can be measured in terms of different layouts, use of language, and the presence of various data fields. Documents that contribute to this diversity, even if they are not the closest to the centroid or in the densest region, may be chosen as exemplars to ensure that the LLM is exposed to the full breadth of the cluster's characteristics. This approach can be particularly useful when dealing with clusters that contain a wide variety of document types or when the clusters themselves are not well-defined or are overlapping in the vector space.

The method 300 then proceeds to a labeling step 312. In this step, the selected exemplar documents undergo a manual labeling process to create accurate annotations for the data fields present in the text. These labels serve as a guide for the LLM in the subsequent information extraction process. The manual labeling process may involve human annotators who are trained to identify and label the relevant data fields in the text. The labels may include information such as the type of data field, the location of the data field in the document, and the value of the data field.

The manual labeling process is a detailed procedure that involves several layers of annotation to ensure the creation of high-quality training data for the LLM. Human annotators, often with domain-specific knowledge, review the OCR text to identify and demarcate data fields such as names, addresses, financial figures, and other pertinent information. They may employ a standardized labeling schema that may include tagging the type of data field, annotating the exact location of the data within the document, and capturing the actual value of the data field. This schema is designed to maintain consistency across different document types and annotators. The process may also involve multiple rounds of verification to minimize errors and ensure the integrity of the labels. Additionally, the annotators may use specialized annotation tools that facilitate the labeling process, allowing for efficient handling of large datasets. These tools can provide features such as automatic suggestion of labels based on previously annotated data, real-time validation of label formats, and collaborative annotation capabilities for teams of annotators. The resulting labeled data is then formatted into a structured form, such as JSON or XML, which can be directly utilized to construct the in-context.

In the context of processing 1099-K tax forms, a specific use case for the clustering and selection method 300, the OCR conversion and embedding step 302 may involve scanning a batch of 1099-K forms, which are typically complex and varied in layout. The OCR engine may convert the images of these forms into text, capturing the diverse fonts and styles used in the financial documents. The text data may then be processed through a text embedding model, such as BGE, to transform it into high-dimensional vectors that encapsulate the semantic richness of the financial information contained within the forms.

The subsequent dimensionality reduction step 304 and DBSCAN clustering step 306 may then organize these vectors into clusters that represent different types of 1099-K forms, perhaps differentiated by year, issuer, or other distinguishing features. The dimensionality reduction may simplify the vectors to a two-dimensional space, making it easier to visualize and understand the natural groupings of the forms. The DBSCAN algorithm may identify clusters based on the density of similar forms, allowing for the isolation of distinct groups that share common characteristics. This clustering is particularly useful for identifying outlier forms or new variations of 1099-K forms that may require special attention.

Once clusters are formed and visualized in step 308, exemplar identification step 310 may involve selecting the 1099-K forms that are the richest in information as exemplars for each cluster. These exemplars may be those with the maximum number of non-empty fields, ensuring they provide a comprehensive representation of the information typically found in that cluster. This strategic selection reduces the labeling workload by focusing on a subset of forms that are likely to train the LLM effectively. The labeling step 312 may see these exemplar forms being labeled by human annotators, creating a high-quality dataset that includes the relevant data fields such as payer information, transaction amounts, and tax identification numbers. These labeled exemplars may serve as the foundation for constructing accurate and effective in-context-learning prompts for the LLM, ultimately improving the system's ability to extract information from new and unseen 1099-K forms with high accuracy and coverage.

Referring now to FIG. 4, process 400 begins with an exemplar preparation step 402. In this step, each cluster exemplar is hand-labeled accurately. This labeling process may involve human annotators who are trained to identify and label the relevant data fields in the text. The labels may include information such as the type of data field, the location of the data field in the document, and the value of the data field. The labels serve as a guide for the LLM in the subsequent information extraction process.

In the exemplar preparation step 402, the precision of labeling is important, as it directly influences the LLM's subsequent performance in information extraction tasks. The human annotators involved in this step are not just trained in the mechanics of labeling but are also often equipped with domain-specific expertise, enabling them to understand the nuances and context of the data fields within the documents. They work with a comprehensive labeling guideline that specifies the criteria for identifying and annotating each type of data field, which may include, but is not limited to, textual content, numerical values, dates, and categorical information. The location of each data field within the document is carefully recorded, taking into account the layout and formatting peculiarities that may be present. This may involve annotating the positional coordinates of the data fields or describing their relative location in the document structure. The value of each data field is captured with high fidelity, ensuring that the information is transcribed accurately from the OCR text. To further enhance the quality of the labeled data, a validation process may be implemented, where multiple annotators review and confirm the accuracy of the labels, or an automated verification system cross-checks the labels against predefined rules or patterns. This rigorous approach to labeling ensures that the exemplar documents serve as high-quality training instances for the LLM, providing it with a rich and accurate dataset from which to learn and generalize.

The method 400 proceeds to a system prompt creation step 404. In this step, the system prompt is defined for the LLM. The system prompt may be designed to define the information extraction task for the LLM. For instance, the system prompt may include instructions on how to extract the relevant data fields from the OCR text. The system prompt may also specify the format in which the extracted information is to be output, such as a structured JSON format. In the system prompt creation step 404, the intricacies of crafting a system prompt for the LLM are addressed with attention to detail. The prompt is formulated to provide unambiguous instructions that guide the LLM through the specific nuances of the information extraction task. It delineates the types of data fields to be extracted, such as names, dates, and financial figures, and underscores the precision and context in which the extraction is to be performed. Additionally, the prompt specifies the expected output format, which may be a structured JSON format, ensuring that the extracted data is organized in a manner that is both machine-readable and conducive to further processing or analysis. The prompt may also include conditional instructions for handling uncertain or ambiguous data, instructing the LLM on how to proceed with low-confidence fields or when to seek clarification. Furthermore, the prompt may incorporate guidelines on maintaining the integrity of the data, such as avoiding the introduction of biases or errors during the extraction process. This comprehensive system prompt serves as a blueprint for the LLM, enabling it to execute the extraction task with a high degree of accuracy and efficiency.

Next, the method 400 proceeds to an in-context example formation step 406. In this step, in-context examples are formed using the OCR text from the exemplar documents and their corresponding labels. These in-context examples provide the LLM with examples of how the information extraction task is performed and serve as a guide for the LLM in the information extraction process. The in-context examples may demonstrate a variety of formats and layouts present within the cluster, providing the LLM with a comprehensive overview of the document distribution.

In the in-context example formation step 406, the system curates a set of examples that encapsulate the diversity of document types within each cluster, using the OCR text and the corresponding labels from the exemplar documents. These examples are crafted to illustrate the breadth of formats, layouts, and content variations that the LLM may encounter, thereby equipping it with a robust understanding of the document distribution. The in-context examples may include, for instance, variations in the arrangement of data fields, differences in terminology used across documents, and the presence of domain-specific language or symbols. By presenting these varied examples, the system ensures that the LLM is exposed to a wide spectrum of scenarios, enhancing its ability to adapt its extraction techniques to new and unseen documents. Moreover, the in-context examples may also highlight edge cases and less common document features, further refining the LLM's predictive capabilities. This comprehensive set of examples serves as a training tool and also as a reference framework that the LLM can draw upon during the information extraction process, thereby improving its performance in terms of accuracy and coverage.

The method 400 proceeds to a prompt concatenation step 408. In this step, the system prompt and the in-context examples are merged into a string. This concatenated string forms the basis of the in-context-learning prompt that will be used to guide the LLM in the information extraction process.

In the prompt concatenation step 408, the fusion of the system prompt with the in-context examples is a process that culminates in the creation of a comprehensive in-context-learning prompt. This concatenated string is crafted to ensure that the LLM is provided with a seamless narrative that not just instructs but also exemplifies the task at hand. The system prompt, which sets the stage by defining the parameters and expectations of the information extraction task, is integrated with the in-context examples that serve as practical demonstrations of the task. These examples, derived from the labeled exemplar documents, showcase the application of the instructions within the system prompt to real-world scenarios, thereby bridging the gap between theory and practice. The amalgamation of these elements into a single string is designed to enhance the LLM's understanding and execution of the information extraction process, providing it with a clear, contextualized, and actionable directive. This unified prompt is utilized to engage the LLM, prompting it to analyze and extract pertinent information from new candidate documents with a level of precision and context-awareness that is informed by the exemplar documents.

The method 400 proceeds to a task prompt addition step 410. In this step, the task directive for the candidate document's OCR is appended to the concatenated string. The task directive may specify the specific information that the LLM is to extract from the candidate document's OCR text.

In the task prompt addition step 410, the system appends a task directive to the concatenated string, which serves as a specific command to the LLM, detailing the exact information to be extracted from the OCR text of the new candidate document. This directive is tailored to the document type and the information extraction requirements, and may include, for example, the extraction of particular data fields such as names, addresses, tax figures, or any other relevant information specified by the use case. The task directive is designed to focus the LLM's attention on the precise elements of the OCR text that are pertinent for extraction, guiding the model to apply the learned patterns from the in-context examples to the new document. It may also instruct the LLM on the format and structure in which to present the extracted data, ensuring consistency and ease of integration into subsequent systems or workflows. This step is beneficial to the overall process as it bridges the gap between the general instructions provided in the system prompt and the specific actionable task at hand, enabling the LLM to perform targeted and accurate information extraction.

The method 400 proceeds to a final prompt assembly step 412. In this step, the prompt components, including the system prompt, the in-context examples, and the task directive, are concatenated to form the final prompt. This final prompt is then used to invoke text generation from the LLM.

In the final prompt assembly step 412, the culmination of the prompt engineering process is realized through the strategic amalgamation of the prompt components into a cohesive and directive final prompt. This final prompt, which is a synthesis of the system prompt, the in-context examples, and the task directive, serves as the guide for the LLM to perform the information extraction task. The system prompt sets the stage by clearly defining the task parameters and expectations, while the in-context examples provide the LLM with a rich context of varied document instances, illustrating the nuances of the information extraction process. The task directive hones the focus of the LLM to the specific OCR text of the new candidate document, pinpointing the exact information that requires extraction. By concatenating these elements, the final prompt encapsulates the essence of the task in a single, comprehensive instruction set. This final prompt is dispatched to the LLM, which, equipped with the contextual knowledge and specific directives, generates text that accurately reflects the extracted information from the candidate document, thereby demonstrating the efficacy of the in-context learning approach in handling infrequently encountered documents.

In the context of processing 1099-K tax forms, the method 400 embodied in FIG. 4 may begin with the exemplar preparation step 402, where selected 1099-K forms from each cluster—identified by their high number of non-empty fields—are labeled by human annotators. These annotators, leveraging their expertise in tax documentation, ensure that each field such as payer's name, transaction amount, and tax identification number is accurately annotated. The labels are validated for precision, as they serve as the foundation for the LLM's learning and subsequent information extraction.

The system prompt creation step 404 involves formulating clear instructions for the LLM, tailored to the intricacies of the 1099-K forms. The prompt may instruct the LLM to extract specific information such as payer details, transaction dates, and amounts, and to output this information in a structured JSON format. This step sets the expectations for the LLM's task and defines the scope of the information extraction process. The in-context example formation step 406 follows, where the labeled exemplar documents are used to create varied examples that demonstrate the range of formats and layouts the LLM might encounter within the 1099-K forms. These examples serve as a guide, providing the LLM with a comprehensive understanding of the document distribution and the types of data it will be extracting.

The subsequent steps, prompt concatenation step 408 and task prompt addition step 410, involve merging the system prompt with the in-context examples into a single, coherent narrative and appending a task directive for the candidate document's OCR. This final prompt, assembled in step 412, directs the LLM to extract the relevant information from a new 1099-K form's OCR text. The LLM, informed by the rich context provided by the exemplar documents, applies its learned patterns to accurately identify and extract the pertinent data fields, demonstrating the method's effectiveness in processing infrequently encountered documents with high accuracy and coverage.

Referring now to FIG. 5, a flowchart of an example performance evaluation and adjustment method 500 is depicted. The method 500 begins with an initial LLM prompting (not shown), where the LLM extracts information from candidate documents using the crafted prompts. This initial prompting serves as a baseline for evaluating the performance of the LLM in extracting information from the candidate documents.

The method 500 proceeds to a result analysis step 502. In this step, the system assesses the accuracy and coverage of the LLM's extracted information. The accuracy refers to the fraction of correct extractions when a field is extracted, while the coverage refers to the fraction of extractions when the field label is present. The system may use various metrics to assess the accuracy and coverage, such as precision, recall, and F1 score.

In the result analysis step 502, the system undertakes a detailed evaluation of the LLM's performance by analyzing the extracted information against a set of ground truth data. The accuracy metric is a measure of the LLM's ability to correctly extract the intended fields, calculated as the proportion of correctly extracted fields out of extractions made. Coverage, on the other hand, assesses the LLM's comprehensiveness in extracting relevant fields, measured as the proportion of fields correctly extracted out of the fields that were supposed to be extracted as indicated by their presence in the ground truth data. To provide a more nuanced understanding of the LLM's performance, the system may employ additional metrics such as precision, which gauges the proportion of true positive extractions out of positive extractions (true positives and false positives), recall, which measures the proportion of true positives out of the total actual positives (true positives and false negatives), and the F1 score, which is the harmonic mean of precision and recall, providing a balance between the two by considering both the false positives and false negatives. These metrics collectively offer a comprehensive picture of the LLM's effectiveness in accurately and completely extracting information from documents, enabling the identification of areas where the LLM may require further refinement or training.

Method 500 proceeds to a performance metrics calculation step 504. In this step, the system calculates improvement factors over base-level LLM and fine-tuned internal models. The improvement factors provide a measure of how much the performance of the LLM has improved compared to the base-level LLM and the fine-tuned internal models. The system may calculate the improvement factors by comparing the accuracy and coverage metrics of the LLM with those of the base-level LLM and the fine-tuned internal models.

In the performance metrics calculation step 504, the system quantifies the extent of performance enhancement achieved by the LLM relative to the base-level LLM and any internally fine-tuned models. This may be accomplished by computing improvement factors, which are indicative of the LLM's progress in terms of accuracy and coverage. Accuracy, in this context, may be defined as the proportion of data fields that are correctly extracted from the OCR text, signifying the precision of the LLM's information retrieval capabilities. Coverage, conversely, measures the LLM's ability to extract pertinent data fields that are present, reflecting the model's thoroughness. These metrics benchmark the LLM's current performance and also guide subsequent optimization efforts. The improvement factors are derived by contrasting the LLM's accuracy and coverage metrics against those of the baseline and fine-tuned models, providing a metric of advancement. This comparative analysis is beneficial in gauging the efficacy of the in-context learning approach and in identifying potential areas for further enhancement of the LLM's performance.

Following the performance metrics calculation step 504, the method 500 proceeds to an evaluation against criteria step 506. In this step, the system compares the performance of the LLM to predefined accuracy and coverage benchmarks. These benchmarks may be set based on the requirements of the specific application or task. If the performance of the LLM falls below these benchmarks, the system initiates a feedback loop for adjustments (e.g., fine tuning).

In the evaluation against criteria step 506, the system compares the LLM's performance metrics—accuracy and coverage—against established benchmarks that are tailored to the specific application or task at hand. These benchmarks may serve as a threshold for acceptable performance levels and are derived from the operational requirements or desired outcomes of the information extraction process. Should the LLM's performance metrics fall short of these benchmarks, indicating a discrepancy between the expected and actual performance, the system triggers a feedback loop. This feedback loop is a systematic process for implementing adjustments, where the in-context-learning prompts are refined to address the identified performance gaps. The refinement may involve enhancing the clarity of the system prompt, enriching the in-context examples with additional or more varied data, or modifying the task directive to better align with the nuances of the candidate documents. This iterative process is designed to incrementally improve the LLM's ability to accurately and comprehensively extract information, ensuring that the system evolves to meet the predefined standards of performance.

The feedback loop initiation step 508 triggers the start of a cycle of adjustments and re-evaluations. In this step, the system initiates a feedback loop to adjust the in-context-learning prompts based on the results of the performance analysis. The adjustments may involve modifying the system prompt, the in-context examples, or both to improve the LLM's information extraction accuracy and coverage.

Upon initiating the feedback loop in step 508, the system embarks on a dynamic process of refinement, where the in-context-learning prompts are analyzed and adjusted to enhance the LLM's performance. This involves a thorough examination of the LLM's outputs in comparison to the ground truth data, identifying patterns in errors or areas where the LLM's extractions diverge from the expected results. Based on these insights, the system prompt may be reworded or expanded to provide clearer guidance, and the in-context examples may be augmented with additional instances or corrected to eliminate misleading information. This iterative feedback mechanism rectifies immediate inaccuracies and also informs the continuous evolution of the LLM's training (e.g., fine tuning), ensuring that subsequent iterations yield increasingly accurate and comprehensive information extraction. The refined prompts are redeployed in a retest with the LLM, allowing for a re-evaluation of performance metrics to ascertain alignment with the predefined benchmarks, thereby closing the feedback loop and solidifying the LLM's proficiency in handling complex document extraction tasks.

Following the feedback loop initiation step 508, the method 500 proceeds to a prompt refinement step 510. In this step, the system adjusts the in-context-learning prompts based on the results of the performance analysis. The adjustments may involve modifying the system prompt, the in-context examples, or both to improve the LLM's information extraction accuracy and coverage.

During the prompt refinement step 510, the system undertakes a comprehensive and iterative process to enhance the efficacy of the in-context-learning prompts, which are beneficial in guiding the LLM's information extraction capabilities. This refinement is informed by the detailed performance analysis from step 502, which may reveal specific inaccuracies or gaps in the LLM's extractions. To address these, the system prompt may be revised to clarify the task or to include additional instructions that address observed deficiencies. For instance, if the LLM consistently misinterprets a particular type of data field, the system prompt can be adjusted to include more explicit instructions regarding that field. Similarly, the in-context examples may be expanded to include a wider range of document variations or to correct any inaccuracies in the examples that may lead to confusion or errors by the LLM. This may involve adding new exemplar documents that better represent the diversity within a cluster or revising the annotations to ensure they are error-free and accurately reflect the intended output. By refining these prompts, the system aims to improve the LLM's accuracy—its ability to correctly identify and extract the intended fields—and its coverage—the extent to which it can extract relevant fields, thereby enhancing the overall performance of the information extraction process.

Method 500 proceeds to a retest with LLM step 512. In this step, the system reapplies the refined prompts to the LLM and extracts information from candidate documents. The system re-evaluates the performance of the LLM based on the extracted information. The method evaluates the adjusted LLM performance and finalizes the adjustments if the performance meets or exceeds the predefined benchmarks. If the performance does not meet the benchmarks, the system may initiate another cycle of adjustments and re-evaluations.

In the retest with LLM step 512, the system reapplies the refined in-context-learning prompts to the LLM, which undertakes a renewed attempt at extracting information from a fresh set of candidate documents. This retest is a beneficial step in the iterative process of performance enhancement, as it provides an opportunity to assess the efficacy of the adjustments made to the prompts. The LLM's output from this retest is compared to a set of ground truth data, allowing the system to evaluate improvements in accuracy and coverage metrics. The re-evaluation process is designed to determine whether the refinements have successfully addressed the deficiencies identified in the previous iteration, and if the LLM's performance now meets or exceeds the predefined benchmarks. Should the LLM's performance still fall short, the feedback loop is continued, with further refinements made to the prompts, followed by additional retesting and evaluation, thus ensuring a continuous cycle of improvement until the desired performance levels are achieved.

In some aspects, the system may leverage the extracted information from all processed documents to create a comprehensive training set for fine-tuning the LLM. By running the entire corpus of documents through this information extraction process, the system may generate a large dataset of predicted labels across all documents. This approach may potentially reduce the reliance on the "in-context" portion of the prompt, as the LLM would have been exposed to a wider range of document variations during the fine-tuning process. The input data for fine-tuning may include not only the original OCR text but also the predicted labels generated by the system, effectively creating a self-supervised learning loop. This method may allow for continuous improvement of the LLM's performance without the need for extensive manual labeling, as the system itself generates the training data.

In the context of processing 1099-K tax forms, the performance evaluation and adjustment method 500 plays a beneficial role. For instance, a tax preparation service may utilize this method to enhance the accuracy and coverage of data extraction from these forms, which are often complex and have limited labeled examples for training machine learning models. Initially, the LLM is prompted to extract information from a batch of 1099-K forms using the crafted in-context-learning prompts. The result analysis step 502 assesses the LLM's extractions against a ground truth dataset, comprising manually labeled 1099-K forms, to evaluate the accuracy and coverage of the extracted information. Metrics such as precision, recall, and F1 score are calculated to provide a comprehensive picture of the LLM's performance, identifying areas where the model excels or may benefit from improvement.

If the LLM's performance metrics do not meet the predefined benchmarks, the system initiates a feedback loop for adjustments, as described in the feedback loop initiation step 508. The tax preparation service may find that the LLM struggles with specific sections of the 1099-K forms, such as accurately extracting merchant category codes or payment transaction amounts. Based on these findings, the prompt refinement step 510 involves adjusting the in-context-learning prompts to address these issues. This may include providing additional examples of correctly labeled merchant category codes or clearer instructions on identifying transaction amounts within the OCR text. Once the prompts are refined, the retest with LLM step 512 is conducted, where the LLM is re-prompted with the adjusted prompts to extract information from a new set of 1099-K forms. The extracted information is re-evaluated against the ground truth data to determine if the adjustments have led to improved accuracy and coverage, ensuring that the tax preparation service can rely on the LLM for efficient and accurate processing of 1099-K forms.

Figure 6:
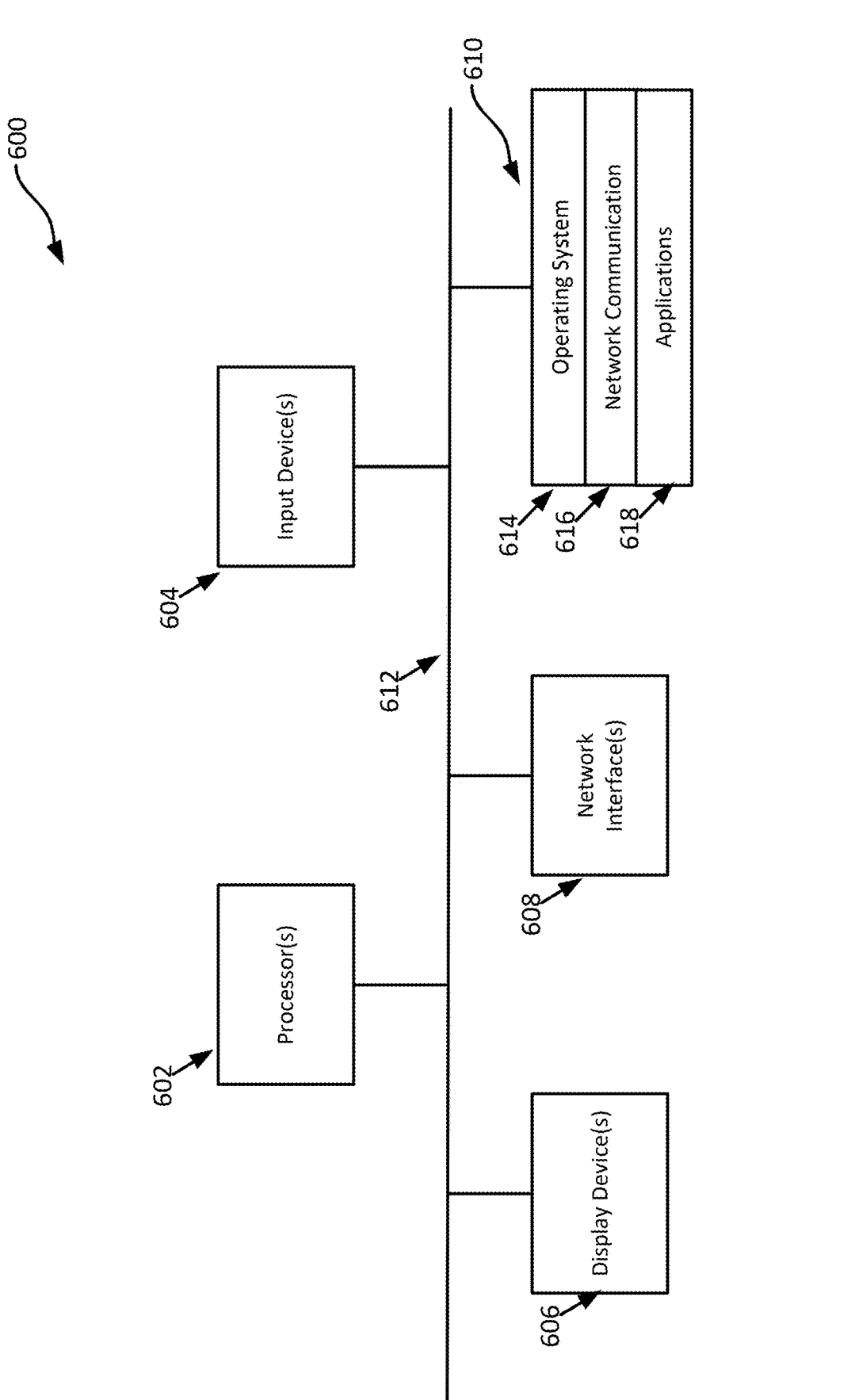
FIG. 6 represents a block diagram of a computer hardware system, according to aspects of the present disclosure.

Referring now to FIG. 6, a block diagram of a computer hardware system 600 is depicted. The computer hardware system 600 may be used to implement the method for extracting information from infrequently encountered documents as described above. The computer hardware system 600 may include one or more processor(s) 602, input device(s) 604, display device(s) 606, network interface(s) 608, and software components 610, all of which are interconnected via a system bus 612. Computer hardware 600 represents an example hardware configuration embodied by the computer devices shown in FIG. 1.

The processor(s) 602 may be configured to execute instructions stored in the software components 610. In some aspects, the processor(s) 602 may include one or more central processing units (CPUs), graphics processing units (GPUs), or other types of processing units. The processor(s) 602 may be responsible for performing the various steps of the method for extracting information from infrequently encountered documents, such as receiving machine-readable text data, processing the text data through a text embedding model, applying a clustering algorithm to the vectors, selecting an example document from each identified cluster, constructing an in-context-learning prompt for a Large Language Model (LLM), and prompting the LLM to extract information from a new candidate document's OCR text based on the constructed prompt.

The input device(s) 604 may be used to provide user input to the computer hardware system 600. The input device(s) 604 may include, for example, a keyboard, a mouse, a touch screen, a microphone, or other types of input devices. In some cases, the input device(s) 604 may be used to provide instructions or parameters for the method for extracting information from infrequently encountered documents.

The display device(s) 606 may be used to present output to a user. The display device(s) 606 may include, for example, a monitor, a projector, a television, a virtual reality headset, or other types of display devices. In some cases, the display device(s) 606 may be used to present the results of the information extraction process, such as the extracted information from the new candidate document's OCR text.

The network interface(s) 608 may be used to facilitate communication between the computer hardware system 600 and other devices or systems via a network. The network interface(s) 608 may include, for example, a network adapter, a wireless network adapter, a modem, or other types of network interfaces. In some cases, the network interface(s) 608 may be used to receive the machine-readable text data from the documents, to send the constructed prompt to the LLM, or to receive the extracted information from the LLM.

The software components 610 may include various software applications, libraries, drivers, or other types of software that are executed by the processor(s) 602. The software components 610 may include an operating system 614, network communication software 616, and applications 618. The operating system 614 may manage the hardware resources of the computer hardware system 600 and provide services for the software applications. The network communication software 616 may facilitate communication between the computer hardware system 600 and other devices or systems via the network. The applications 618 may include various software applications that implement the method for extracting information from infrequently encountered documents.

The system bus 612 may facilitate communication between the processor(s) 602, the input device(s) 604, the display device(s) 606, the network interface(s) 608, and software components 610. The system bus 612 may include one or more data buses, address buses, control buses, or other types of buses.

While the foregoing is directed to example embodiments described herein, other and further example embodiments may be devised without departing from the basic scope thereof. For example, aspects of the present disclosure (e.g., modules) may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are not limiting. It is intended that permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed:

1. A method of extracting information from documents, comprising:

receiving machine-readable text data extracted from documents via Optical Character Recognition (OCR);

processing the text data through a text embedding model to transform the text data into a high-dimensional vector space representation;

applying a clustering algorithm to the vectors to identify natural groupings within the data and representative clusters within a distribution of the documents;

selecting an example document from each identified cluster based on at least one of a number of non-empty fields in the example document and a relationship between the example document and other documents in the cluster;

constructing an in-context-learning prompt for a Large Language Model (LLM) using labels in the documents including accurate annotations for the data fields present in the text, the prompt including a system prompt that defines information extraction for the LLM and in-context examples comprising the OCR text from the example documents and their corresponding labels; and prompting the LLM to extract information from a new candidate document's OCR text based on the constructed prompt.

2. The method of claim 1, performing at least one of Density-Based Spatial Clustering of Applications with Noise (DBSCAN), K-Means clustering, or Hierarchical clustering as the clustering algorithm.

3. The method of claim 1, further comprising, during the selecting step, prioritizing example documents with a higher number of non-empty fields over those with fewer non-empty fields.

4. The method of claim 1, further comprising, during the selecting step, evaluating the relationship between the example document and other documents in the cluster based on at least one of semantic similarity, structural similarity, or source similarity.

5. The method of claim 1, further comprising, during the constructing step, generating the system prompt to include instructions for the LLM that specify the types of information to be extracted from the new candidate document.

6. The method of claim 1, further comprising, during the constructing step, selecting in-context examples that demonstrate a variety of formats and layouts present within the cluster.

7. The method of claim 1, further comprising, during the constructing step, creating the in-context-learning prompt to include negative examples that illustrate common errors to be avoided by the LLM.

8. The method of claim 1, further comprising evaluating a performance of the LLM in extracting information from the new candidate document by comparing the extracted information to a set of ground truth data, wherein the performance evaluation includes calculating accuracy and coverage metrics.

9. The method of claim 8, further comprising, during the evaluating of the performance step, adjusting the in-context-learning prompt based on results of the performance evaluation, wherein the adjustment includes modifying the system prompt, the in-context examples, or both to improve the LLM's information extraction accuracy and coverage.

10. The method of claim 9, further comprising, during the evaluating of the performance step, fine tuning the LLM with the adjusted in-context-learning prompt and re-evaluating the LLM's performance on a subsequent set of new candidate documents to determine if the adjustments meet or exceed predefined performance benchmarks.

11. A system for extracting information from documents, the system comprising a processor configured to:

receive machine-readable text data extracted from documents via Optical Character Recognition (OCR);

process the text data through a text embedding model to transform the text data into a high-dimensional vector space representation;

apply a clustering algorithm to the vectors to identify natural groupings within the data and representative clusters within a distribution of the documents;

select an example document from each identified cluster based on at least one of a number of non-empty fields in the example document and a relationship between the example document and other documents in the cluster;

construct an in-context-learning prompt for a Large Language Model (LLM) using labels in the documents including accurate annotations for the data fields present in the text, the prompt including a system prompt that defines information extraction for the LLM and in-context examples comprising the OCR text from the example documents and their corresponding labels; and prompt the LLM to extract information from a new candidate document's OCR text based on the constructed prompt.

12. The system of claim 11, wherein the processor is further configured to perform at least one of Density-Based Spatial Clustering of Applications with Noise (DBSCAN), K-Means clustering, or Hierarchical clustering as the clustering algorithm.

13. The system of claim 11, wherein the processor is further configured to, during the selecting, prioritize example documents with a higher number of non-empty fields over those with fewer non-empty fields.

14. The system of claim 11, wherein the processor is further configured to, during the selecting, evaluate the relationship between the example document and other documents in the cluster based on at least one of semantic similarity, structural similarity, or source similarity.

15. The system of claim 11, wherein the processor is further configured to, during the constructing, generate the system prompt to include instructions for the LLM that specify types of information to be extracted from the new candidate document.

16. The system of claim 11, wherein the processor is further configured to, during the constructing, select in-context examples that demonstrate a variety of formats and layouts present within the cluster.

17. The system of claim 11, wherein the processor is further configured to, during the constructing, create the in-context-learning prompt to include negative examples that illustrate common errors to be avoided by the LLM.

18. The system of claim 11, wherein the processor is further configured to evaluate a performance of the LLM in extracting information from the new candidate document by comparing the extracted information to a set of ground truth data, wherein the performance evaluation includes calculating accuracy and coverage metrics.

19. The system of claim 18, wherein the processor is further configured to, during the evaluating of the performance, adjust the in-context-learning prompt based on results of the performance evaluation, wherein the adjustment includes modifying the system prompt, the in-context examples, or both to improve the LLM's information extraction accuracy and coverage.

20. The system of claim 19, wherein the processor is further configured to, during the evaluating of the performance, fine tuning the LLM with the adjusted in-context-learning prompt and re-evaluate the LLM's performance on a subsequent set of new candidate documents to determine if the adjustments meet or exceed predefined performance benchmarks.

* * * * *